US012563088B1

(12) United States Patent
Padiyar et al.

(10) Patent No.: US 12,563,088 B1
(45) Date of Patent: Feb. 24, 2026

(54) SYSTEM AND METHOD TO DYNAMICALLY ANALYZE BIOMETRIC DATA

(71) Applicant: Bank of America Corporation, Charlotte, NC (US)

(72) Inventors: Sneha Padiyar, Andheri East (IN); Sakshi Bakshi, New Delhi (IN); Janani Nagarajan, Chennai (IN); Kamini Agarwal, New Delhi (IN); Sravani Nadavala, Nellore (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 18/815,517

(22) Filed: Aug. 26, 2024

(51) Int. Cl.
*H04L 9/40* (2022.01)
(52) U.S. Cl.
CPC ...... *H04L 63/1441* (2013.01); *H04L 63/0861* (2013.01)
(58) Field of Classification Search
CPC ........................ H04L 63/1441; H04L 63/0861
See application file for complete search history.

(56) References Cited

U.S. PATENT DOCUMENTS

| | | | |
|---|---|---|---|
| 7,604,165 B2 | 10/2009 | Ramachandran | |
| 8,316,237 B1 | 11/2012 | Felsher et al. | |
| 8,942,431 B2 | 1/2015 | Forero et al. | |
| 9,094,388 B2 | 7/2015 | Tkachev | |
| 9,483,742 B1 * | 11/2016 | Ahmed | H04L 63/1441 |
| 9,779,316 B2 | 10/2017 | Rao et al. | |
| 10,645,100 B1 * | 5/2020 | Wang | H04L 63/1433 |
| 10,992,763 B2 | 4/2021 | Kursun et al. | |
| 11,269,983 B2 | 3/2022 | Kursun | |
| 11,275,819 B2 * | 3/2022 | Kursun | G06F 21/577 |
| 11,538,126 B2 | 12/2022 | Vemury | |
| 11,750,602 B2 * | 9/2023 | Frankston | H04L 41/28 713/186 |
| 11,789,699 B2 | 10/2023 | Streit | |
| 11,863,579 B1 | 1/2024 | Casillas et al. | |
| 2007/0112775 A1 | 5/2007 | Ackerman | |
| 2017/0192872 A1 * | 7/2017 | Awad | G06F 18/2433 |
| 2018/0300730 A1 * | 10/2018 | Telford-Reed | H04L 63/0861 |
| 2020/0002977 A1 * | 1/2020 | Russi-Vigoya | E05B 39/04 |
| 2020/0265070 A1 | 8/2020 | Rapaport et al. | |
| 2021/0056976 A1 * | 2/2021 | Brown | G06F 16/683 |
| 2021/0209249 A1 | 7/2021 | Hoffer | |

(Continued)

*Primary Examiner* — Dhairya A Patel

(57) ABSTRACT

A system comprises a memory communicatively coupled to at least one processor. The at least one processor is configured to execute a machine learning algorithm to determine type information associated with the biometric data, assign evaluation of the biometric data to multiple nodes in a decentralized network based at least in part upon the type information, determine, in the decentralized network, whether the biometric data comprises a predefined format corresponding to the type information, transmit the biometric data to a deep learning network configured to perform multiple anomaly detection operations that evaluate authenticity of the biometric data in response to determining that the biometric data comprises the predefined format corresponding to the type information, and flag the biometric data as being associated with suspicious activity in response to determining that an overall pattern of the biometric data matches at least one portion of a suspicious pattern.

20 Claims, 3 Drawing Sheets

(56) References Cited

U.S. PATENT DOCUMENTS

| | | | |
|---|---|---|---|
| 2021/0400049 A1 | 12/2021 | Denning et al. | |
| 2022/0138321 A1 * | 5/2022 | Shrestha | G06F 16/285 |
| | | | 713/187 |
| 2022/0318348 A1 * | 10/2022 | Sims | G06F 21/32 |

* cited by examiner

System 100

PROCESS 300

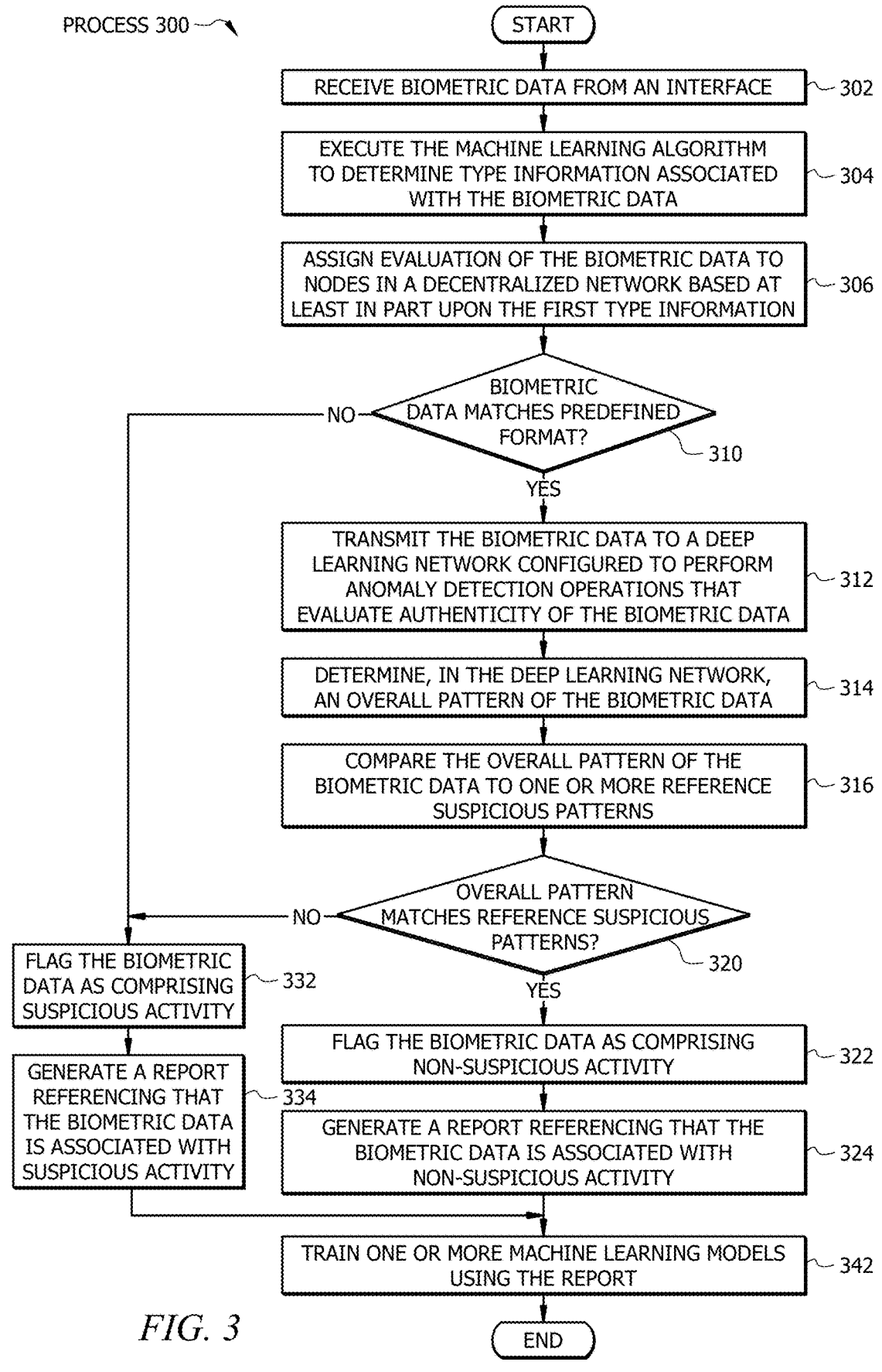

START

RECEIVE BIOMETRIC DATA FROM AN INTERFACE — 302

EXECUTE THE MACHINE LEARNING ALGORITHM TO DETERMINE TYPE INFORMATION ASSOCIATED WITH THE BIOMETRIC DATA — 304

ASSIGN EVALUATION OF THE BIOMETRIC DATA TO NODES IN A DECENTRALIZED NETWORK BASED AT LEAST IN PART UPON THE FIRST TYPE INFORMATION — 306

BIOMETRIC DATA MATCHES PREDEFINED FORMAT? — 310

NO

YES

TRANSMIT THE BIOMETRIC DATA TO A DEEP LEARNING NETWORK CONFIGURED TO PERFORM ANOMALY DETECTION OPERATIONS THAT EVALUATE AUTHENTICITY OF THE BIOMETRIC DATA — 312

DETERMINE, IN THE DEEP LEARNING NETWORK, AN OVERALL PATTERN OF THE BIOMETRIC DATA — 314

COMPARE THE OVERALL PATTERN OF THE BIOMETRIC DATA TO ONE OR MORE REFERENCE SUSPICIOUS PATTERNS — 316

OVERALL PATTERN MATCHES REFERENCE SUSPICIOUS PATTERNS? — 320

NO

YES

FLAG THE BIOMETRIC DATA AS COMPRISING SUSPICIOUS ACTIVITY — 332

FLAG THE BIOMETRIC DATA AS COMPRISING NON-SUSPICIOUS ACTIVITY — 322

GENERATE A REPORT REFERENCING THAT THE BIOMETRIC DATA IS ASSOCIATED WITH SUSPICIOUS ACTIVITY — 334

GENERATE A REPORT REFERENCING THAT THE BIOMETRIC DATA IS ASSOCIATED WITH NON-SUSPICIOUS ACTIVITY — 324

TRAIN ONE OR MORE MACHINE LEARNING MODELS USING THE REPORT — 342

*FIG. 3*

END

SYSTEM AND METHOD TO DYNAMICALLY ANALYZE BIOMETRIC DATA

TECHNICAL FIELD

The present disclosure relates generally to providing security operations, and more specifically to a system and method to dynamically analyze biometric data.

BACKGROUND

In certain communication systems, bad actors may attempt to gain access to network resources and/or sensitive data by providing falsified biometric data that one or more verification devices in the communication systems may associate with one or more user profiles. These bad actors may attempt to gain access to the network resources and/or the sensitive data after bypassing biometric security defenses. The falsified biometric data may be confused with real biometric data corresponding to users of one or more user profiles. The bad actors may present themselves to the communication systems by spoofing biometric data and/or pretending to be associated with one or more user devices previously associated with user profiles trusted by the communication system. The communication systems may erroneously interpret the falsified biometric data as belonging to one or more users associated with the one or more user profiles.

SUMMARY OF THE DISCLOSURE

In one or more embodiments, a system and method are configured to dynamically analyze biometric data. In particular, the system may be configured to execute one or more machine learning (ML) algorithms to evaluate the authenticity of biometric data received by one or more physical interfaces over a period of time. The system may be configured to maintain multiple biometric data formats and multiple reference suspicious patterns of behavior that are previously determined to be associated with suspicious activity and/or electronic attackers. The system may be configured to receive biometric data, execute the ML algorithms to verify formatting associated with specific types of biometric data, and determine one or more patterns associated with a presentation of the biometric data. The biometric data may be received from one or more physical interfaces available to users of a communication system. The ML algorithms may be executed to determine a format of the received biometric data and determine whether the format matches existing data formats. The systems may be configured to determine one or more patterns in the biometric data and determine whether the one or more patterns match at least a portion of suspicious patterns. In some embodiments, the system may be configured to train one or more ML model (e.g., one or more cognitive artificial intelligence (AI) models and/or one or more one or more neural network models among others) to predict possible changes to biometric data presented by entities in a communication network based on data collected from one or more interfaces. The system may be configured to use a decentralized network (e.g., blockchain-based network) to evaluate the data format associated with the received biometric data and a deep learning network to dynamically evaluate tolerance of changes in the reference biometric data.

In one or more embodiments, the system is configured to implement a dynamic real-time processing engine that continuously ingest biometric data, applies a symbolic neural network model for validation, and generate responses in real-time. Herein, the system may be configured to alert one or more mechanisms to detect anomalies and/or failures in received biometric data and notify security personnel in real-time. The system may be configured to implement logging and reporting features to facilitate forensic analysis and auditing. During training, the system may be configured to adapt and/or evolve new fraud patterns emerging over time. The system may be configured to prevent and detect various suspicious activity (e.g., fraud) using semi parametrized neuro-symbolic processor along with decentralized operations that use knowledge graphs that are dynamic based on parameterized semi-static nodes. In one or more embodiments, fraud detection rules are identified using convolutional neural networks (CNNs) based on various factors comprising unusual user behavior, pattern recognition, consistency checks, temporal analysis, anomaly detection, and/or adversarial attack detection among others. In some embodiments, the one or more neural network models may be configured to identify fraudulent patterns that are then processed in one or more neuro-symbolic operations, which in turn proactively generates warnings in case of similar fraudulent transactions are identified over time. The system may be configured to continuously (without waiting intervals) and/or periodically process multiple received biometric data along with authentication that generates and sends alerts notifying one or more fraudulent activities in the communication system. The system may be configured to detect anomalies and/or failures in the received biometric data. The system may be configured to adapt and evolve new fraud patterns over time.

In one or more embodiments, the system described herein are integrated into a practical application to improve security in a communication network by determining whether entities performing one or more actions in the communication network are associated with user devices or electronic attackers. In particular, the system may be configured to execute an ML algorithm to analyze biometric data received from the entities in the communication network and determine whether the biometric data comprises suspicious activity performed by the one or more entities. The system may be configured to evaluate a format associated with the received biometric data and a deep learning network to evaluate patterns associated with the biometric data. Over time, the ML algorithm is configured to evaluate possible changes to suspicious patterns and evolve the suspicious patterns to account for new suspicious activities thereby creating a growing and changing repository of suspicious patterns that may be compared with patterns determined in future received biometric data.

In one or more embodiments, the system is directed to improvements in computer systems. Specifically, the system reduces processor and memory usage in servers and/or user devices by quickly identifying bad actors from legitimate users attempting to access network resources and/or sensitive data in a communication network. As entities are determined to be bad actors based on their actions in the network, the system is configured to filter these bad actors from accessing some or all network resources and/or sensitive information in the network. Herein, processing and memory usage is reduced because processing and memory resources are not made available to all entities attempting to access the network. Instead, the system filters out bad actors and the processing and memory resources are made accessible to entities determined to be legitimate users. Further, the system is configured to prevent resources from being wasted retrieving data and/or restoring sensitive information in the communication network. In this regard, the system inhibits tracking of possible adverse impacts that bad actors could have caused in the network were the bad actors to reach sensitive information and/or network resources. As a result, workforce hours, processing resources, memory resources, and/or power resources are not spent retroactively tracking the actions of bad actors in the communication network.

In one or more embodiments, the system may comprise an apparatus, such as the server. Further, the system may be a data exchange system, which comprises the apparatus. In addition, the system may be configured to perform operations as part of a process performed by the apparatus. As a non-limiting example, the system may comprise a memory and at least one processor communicatively coupled to one another. The memory may be operable to store a machine learning algorithm configured, when executed, to evaluate data in accordance with one or more neural network models and multiple suspicious patterns previously determined to be performed by electronic attackers. The at least one processor may be configured to receive biometric data from an interface. The biometric data may be associated with a user profile. Further, the at least one processor may be configured to execute the machine learning algorithm to determine type information associated with the biometric data, assign evaluation of the biometric data to multiple nodes in a decentralized network based at least in part upon the type information, determine, in the decentralized network, whether the biometric data comprises a predefined format corresponding to the type information, transmit the biometric data to a deep learning network configured to perform multiple anomaly detection operations that evaluate authenticity of the biometric data in response to determining that the biometric data comprises the predefined format corresponding to the type information, determine, in the deep learning network, an overall pattern of the biometric data, compare the overall pattern of the biometric data to the suspicious patterns, determine whether the overall pattern of the biometric data matches at least a portion of a suspicious pattern of the suspicious patterns, and flag the biometric data as being associated with suspicious activity in response to determining the overall pattern of the biometric data matches at least a portion of a suspicious pattern of the suspicious patterns. The nodes may be configured to perform one or more neuro-symbolic processing operations that evaluate an overall format of the biometric data.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 3 illustrates an example flowchart of a method to perform the security operations of FIG. 2 in accordance with one or more embodiments.

DETAILED DESCRIPTION

Figure 1:
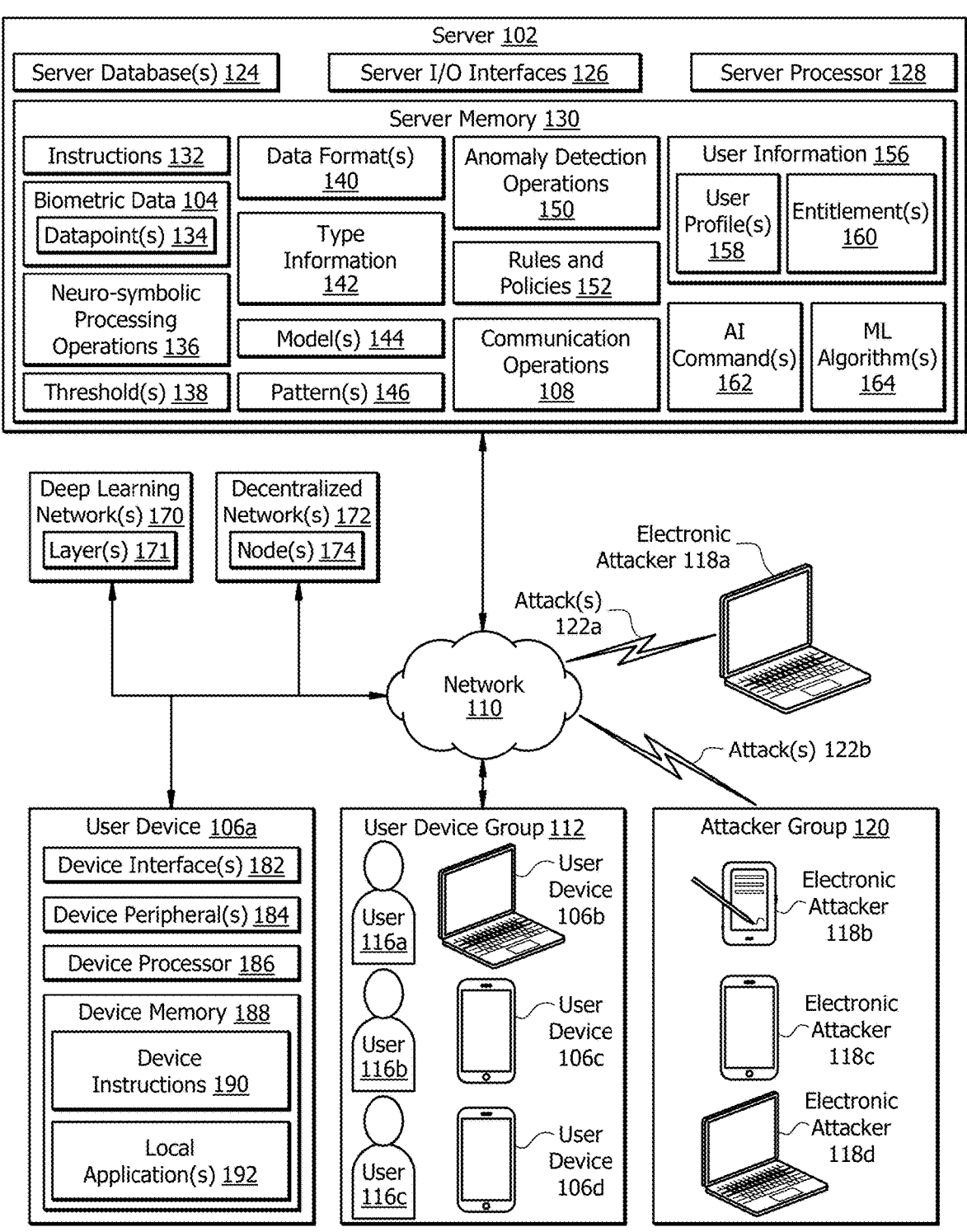
FIG. 1 illustrates a system in accordance with one or more embodiments.
Figure 2:
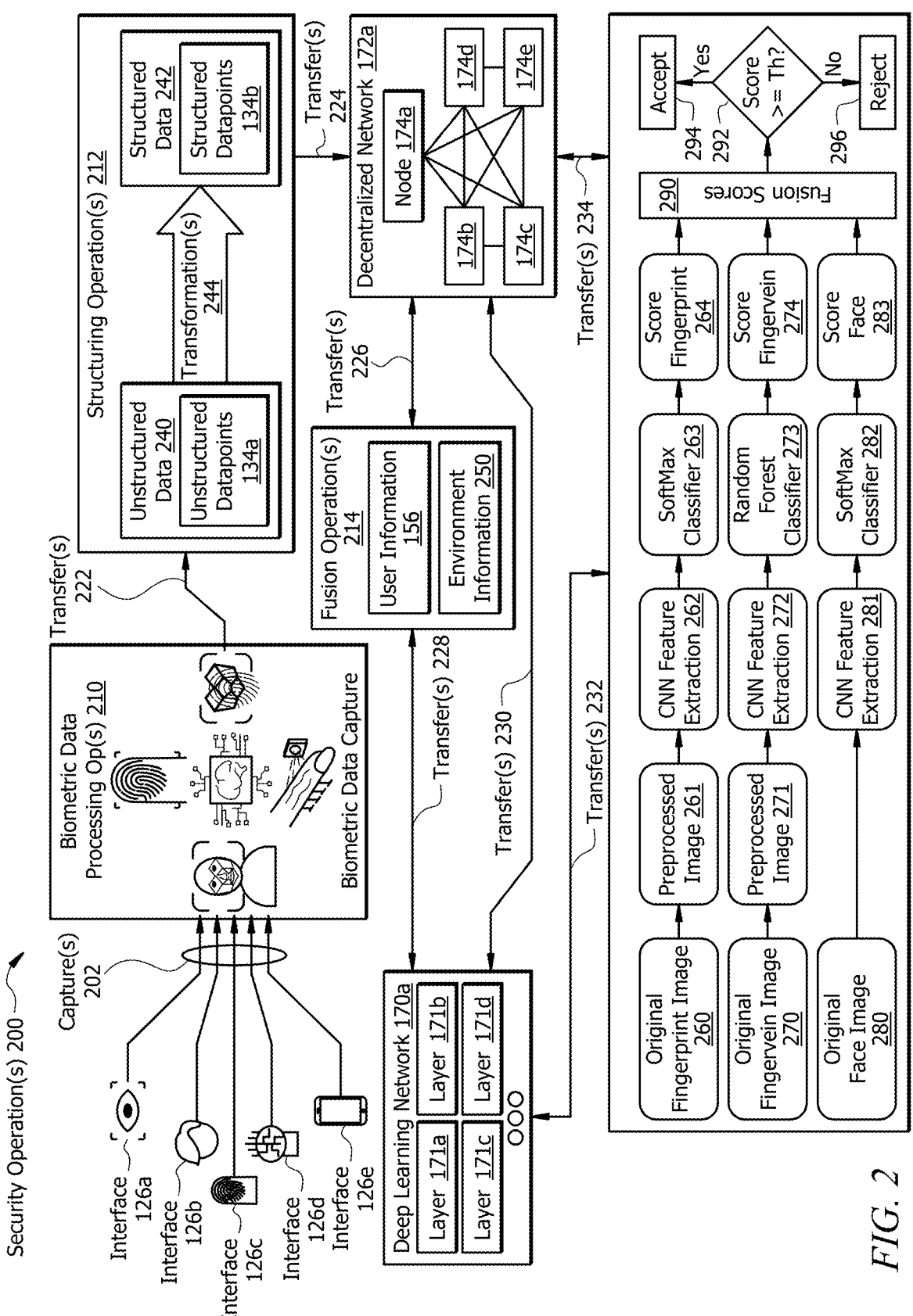
FIG. 2 illustrates multiple security operations configured to dynamically analyze biometric data in accordance with one or more embodiments.

As described above, this disclosure provides various systems and methods to dynamically analyze biometric data. FIG. 1 illustrates a system 100 in which a server 102 configured to analyze biometric data 104 received from a communication network. FIG. 2 illustrates multiple security operations 200 performed by the system 100 of FIG. 1. FIG. 3 illustrates a process 300 performed by the system 100 of FIG. 1.

System Overview

FIG. 1 illustrates an example system 100, in accordance with one or more embodiments. The system 100 may comprise a server 102 configured to configured to analyze biometric data 104 received from a communication network. The system 100 includes a server 102 communicatively coupled to a user device 106a, a user device 106b, a user device 106c, and a user device 106d (collectively, user devices 106) via a network 110. The user devices 106 may be user nodes configured to trigger exchanges of data and/or perform one or more communication operations 108 with the server 102 via the network 110. The user devices 106 may be working nodes configured to receive instructions to perform one or more communication operations 108 based on instructions received from the server 102. In some embodiments, some of the user devices 106 may be clustered together in one or more user device groups 112. Each of the user devices 106 may be associated with one or more corresponding operators. These operators are shown as a user 116a, a user 116b, and a user 116c (collectively, users 116) in the user device groups 112. In FIG. 1, the user device group 112 is shown comprising the user 116a associated with the user device 106b, the user 116b associated with the user device 106c, and the user 116c associated with the user device 106d.

In one or more embodiments, the example of FIG. 1 shows an electronic attacker 118a, an electronic attacker 118b, an electronic attacker 118c, and an electronic attacker 118d (collectively, electronic attackers 118). In some embodiments, some of the electronic attackers 118 may be clustered together in one or more attacker groups 120. In FIG. 1, the attacker group 120 is shown comprising the electronic attacker 118b, the electronic attacker 118c, and the electronic attacker 118d. These electronic attackers 118 may be bad actors attempting to perform one or more attacks 122 (e.g., attacks 122a and attacks 122b) to the server 102, the user devices 106, the network, and/or the user device groups 112.

In one or more embodiments, the server 102 may comprise one or more server databases 124, one or more server input (I)/output (O) interfaces 126, at least one server processor 128, and at least one server memory 130 communicatively coupled to one another. In some embodiments, the server memory 130 may comprise instructions 132, the biometric data 104 comprising one or more datapoints 134, one or more neuro-symbolic processing operations 136, one or more thresholds 138, one or more biometric data formats 140, type information 142 associated with each of the biometric data 104, one or more models 144, one or more patterns 146, one or more anomaly detection operations 150, one or more rules and policies 152, the one or more communication operations 108, user information 156 comprising one or more user profiles 158 associated with one or more entitlements 160 to access one or more services (e.g., applications) in a communication network (e.g., the network 110), one or more artificial intelligence commands 162, one or more machine learning (ML) algorithms 164 configured to train the one or more models 144.

In some embodiments, the server 102 is communicatively coupled to the user devices 106, one or more deep learning networks 170 configured to process and/or analyze the biometric data 104, and one or more decentralized networks 172 configured to perform and/or host one or more decentralized operations in association with the communication operations 108. The server 102 may be configured to use one or more nodes 174 in the one or more decentralized networks 172 (e.g., blockchain-based network) to evaluate a data format 140 associated with the received biometric data 104 and one or more deep learning networks 170 comprising one or more layers 171 to dynamically evaluate tolerance of changes in the reference biometric data 104.

Referring to the user device 106a a non-limiting example, the user device 106a may comprise one or more device interfaces 182, one or more device peripherals 184, at least one device processor 186, and at least one device memory 188 communicatively coupled to one another. The device memory 188 may comprise device instructions 190 and/or one or more local applications 192.

System Components

Server

The server 102 is generally any device or apparatus that is configured to process data and communicate with computing devices (e.g., the user devices 106), additional databases, systems, and the like, via the one or more server I/O interfaces 126 (i.e., a user interface or a network interface). The server 102 may comprise the server processor 128 that is generally configured to oversee operations of the processing engine. The operations of the processing engine are described further below in conjunction with the system 100 described in FIG. 1, the security operations 200 in FIG. 2, and the process 300 described in FIG. 3.

The server 102 comprises multiple server databases 124 configured to provide one or more memory resources to the server 102 and/or the user devices 106. The server 102 comprises the server processor 128 communicatively coupled with the server databases 124, the server I/O interfaces 126, and the server memory 130. The server 102 may be configured as shown, or in any other configuration. In one or more embodiments, the server databases 124 are configured to store data that enables the server 102 to configure, manage and coordinate one or more middleware systems. In some embodiments, the server databases 124 store data used by the server 102 to function as a halfway point in between one or more services and other tools or databases.

In one or more embodiments, the server I/O interfaces 126 may be configured to enable wired and/or wireless communications. The server I/O interfaces 126 may be configured to communicate data between the server 102 and other user devices (i.e., the user devices 106), network devices (i.e., routers in the network 110), systems, or domain(s) via the network 110. For example, the server I/O interfaces 126 may comprise a WI-FI interface, a LAN interface, a WAN interface, a modem, a switch, or a router. The server processor 128 may be configured to send and receive data using the server I/O interfaces 126. The server I/O interfaces 126 may be configured to use any suitable type of communication protocol. In some embodiments, the server I/O interfaces 126 may be an admin console comprising a web browser-based or graphical user interface used to manage a middleware server domain via the server 102. A middleware server domain may be a logically related group of middleware server resources that managed as a unit. A middleware server domain may comprise the server 102 and one or more managed servers. The managed servers may be standalone devices and/or collected devices in the server cluster. The server cluster may be a group of managed servers that work together to provide scalability and higher availability for the services. In this regard, the services are developed and deployed as part of at least one domain. In other embodiments, one instance of the managed servers in the middleware server domain may be configured as the server 102. The server 102 provides a central point for managing and configure the managed servers and any of the one or more services.

The server processor 128 comprises one or more processors communicatively coupled to the server memory 130. The server processor 128 may be any electronic circuitry, including, but not limited to, state machines, one or more central processing unit (CPU) chips, logic units, cores (e.g., a multi-core processor), field-programmable gate arrays (FPGAs), application-specific integrated circuits (ASICs), or digital signal processors (DSPs). The server processor 128 may be a programmable logic device, a microcontroller, a microprocessor, or any suitable combination of the preceding. The one or more server processor 128 are configured to process data and may be implemented in hardware or software executed by hardware. For example, the server processor 128 may be 8-bit, 16-bit, 32-bit, 64-bit or of any other suitable architecture. The server processor 128 may include an arithmetic logic unit (ALU) for performing arithmetic and logic operations, processor registers that supply operands to the ALU and store the results of ALU operations, and a control unit that fetches the instructions 132 from the server memory 130 and executes them by directing the coordinated operations of the ALU, registers and other components. In this regard, the one or more server processor 128 are configured to execute various instructions. For example, the one or more server processor 128 are configured to execute the instructions 132 to implement the functions disclosed herein, such as some or all of those described with respect to FIGS. 1-3. In some embodiments, the functions described herein are implemented using logic units, FPGAs, ASICs, DSPs, or any other suitable hardware or electronic circuitry.

In one or more embodiments, the server I/O interfaces 126 may be any suitable hardware and/or software to facilitate any suitable type of wireless and/or wired connection. These connections may include, but not be limited to, all or a portion of network connections coupled to the Internet, an Intranet, a private network, a public network, a peer-to-peer network, the public switched telephone network, a cellular network, a local area network (LAN), a metropolitan area network (MAN), a wide area network (WAN), and a satellite network. The server I/O interfaces 126 may be configured to support any suitable type of communication protocol as would be appreciated by one of ordinary skill in the art. In one or more embodiments, the server I/O interfaces 126 may comprise one or more sensors configured to evaluate physical phenomena surrounding the server 102 and/or one or more of the user devices 106. The sensors may be proximity sensors, optical sensors, and the like.

The server memory 130 may be volatile or non-volatile and may comprise a read-only memory (ROM), random-access memory (RAM), ternary content-addressable memory (TCAM), dynamic random-access memory (DRAM), and static random-access memory (SRAM). The server memory 130 may be implemented using one or more disks, tape drives, solid-state drives, and/or the like. The server memory 130 is operable to store the instructions 132, the biometric data 104 comprising one or more datapoints 134, the one or more neuro-symbolic processing operations 136, the one or more thresholds 138, the one or more biometric data formats 140, the type information 142 associated with each of the biometric data 104, the one or more models 144, the one or more patterns 146, the one or more anomaly detection operations 150, the one or more rules and policies 152, the one or more communication operations 108, the user information 156 comprising the one or more user profiles 158 associated with the one or more entitlements 160 to access one or more services (e.g., applications) in a communication network (e.g., the network 110), the one or more artificial intelligence commands 162, the one or more machine learning (ML) algorithms 164 configured to train the one or more models 144. The instructions 132 may comprise any suitable set of instructions, logic, rules, or code operable to execute the server processor 128.

The one or more communication operations 108 may be one or more data exchanges performed between two or more network devices in the system 100. The network devices may comprise the server 102 and one or more of the user devices 106 among others. In one or more embodiments, the communication operations 108 may be audio communications exchanged as part of audio conversations (e.g., during a telephonic call) between two or more network devices. The communication operations 108 may be image and/or text communications exchanged as part of image-based conversations (e.g., during videocalls and/or chat exchanges) between two or more network devices.

The biometric data 104 may comprise information associated with one or more of the communication operations 108, information associated with one or more entities, and one or more tracked activities associated with the entities. The biometric data 104 may comprise information provided by and/or obtained from the entities during one or more communication operations 108 in the network 110. The server 102 may be configured to perform one or more retrieving operations configured to determine biometric data 104 in the tracked activities from the communication operations 108 and generate one or more reports associated with interactions of the entities in the network 110. The biometric data 104 may be collected continuously without interruptions and/or periodically over time and/or periods of time. The biometric data 104 may comprise one or more datapoints 134 referencing one or more physical aspects of a portion of one or more users 116. The biometric data 104 may be obtained via one or more ML models configured with a natural language processing (NPL) that identifies conversations associated with one or more of the users 116. The biometric data 104 may be captured via the one or more server interfaces 126 and/or the one or more device interfaces 182. The biometric data 104 may comprise multiple sound, text, and/or action data samples. Each data sample may comprise a magnitude and a duration. The biometric data 104 may be configured to reference one or more attempted actions associated with the communication operations 108.

In one or more embodiments, the biometric data 104 may indicate one or more changes in the behavior associated with one or more of the entities. In one or more embodiments, the datapoints 134 are information data representative on one or more aspects of the communication operations 108 performed and/or triggered by the one or more entities in the network 110. The datapoints 134 may be data that represents extracted information and/or summarized information of the biometric data 104 associated with one or more operations attempted and/or performed by the entities. In the example of FIG. 1, the datapoints 134 may be business metadata used by one of the applications and may be dynamic in nature. The datapoints 134 may be individual aspects of the biometric data 104. For example, biometric data 104 comprising an image of a portion of an iris scan, the datapoints 134 may be individual pixels of the image comprising one or more data formats 140, comprising a type information 142, and forming one or more specific patterns 146.

The thresholds 138 may be one or more specific numbers and/or number ranges associated with a specific parameter and/or indicator. The thresholds 138 may be a specific value representing a higher boundary or a lower boundary. The thresholds 138 may be one or more threshold ranges comprising higher boundaries and lower boundaries. The thresholds 138 may be a percentage value representing a similarity and/or a difference between one or more values assigned to currently determined patterns 146 and/or one or more values assigned to reference suspicious patterns 146. The thresholds 138 may be determined based on information associated with the communication operations 108. The thresholds 138 may be determined dynamically over time. The thresholds 138 may be predefined and/or predetermined in accordance with information in activity associated with one or more of the communication operations 108. In some embodiments, the server 102 may be configured to calculate the thresholds 138 based on information obtained via the server I/O interfaces 126 and/or device interfaces 182.

The patterns 146 may be representative of one or more intents to perform a specific communication operation 108. The patterns 146 may be one or more action items to be performed to at least partially fulfill one or more target operations associated with the biometric data 104. In some embodiments, the thresholds 138 may show intents of actions to be performed to meet one or more target commands at least partially. The patterns 146 may be mapped to one or more existing communication operations 108. The patterns 146 may show predicted future behaviors that one or more of the entities are expected to perform in the communication network. In some embodiments, the patterns 146 may be one or more assumed actions associated with the communication operations 108.

In some embodiments, each of the patterns 146 may comprise one or more datapoints 134 connected and/or related in sequence. The patterns 146 may be representative of an appearance of the datapoints 134 in specific locations within the biometric data 104. For example, for biometric data 104 comprising a portion of an image of an eye (e.g., obtained from an iris scan), one or more patterns 146 may comprise lines shaping the eye and/or portions of the eye. In this regard, the patterns 146 may reference and/or show connectivity between one or more pixels in the image of the eye. The patterns 146 may be generated, created, evaluated, and/or analyzed in the one or more deep learning networks 170. The patterns 146 may comprise multiple portions and/or sections. These portions and/or sections may be evaluated and/or analyzed individually and/or in clusters (e.g., groups).

The neuro-symbolic processing operations 136 may be one or more operations configured to evaluate and/or analyze information associated with one or more operations of the entities accessing the network 110. The neuro-symbolic processing operations 136 may be stored in one or more data formats. The server 102 may be configured to generate one or more access commands based on biometric data 104. In this regard, the neuro-symbolic processing operations 136 may be operations configured to indicate modifications and/or assignments of one or more network resources in the network 110. The neuro-symbolic processing operations 136 may be replaced, updated, and/or modified dynamically. The neuro-symbolic processing operations 136 may be replaced, updated, and/or modified periodically. The neuro-symbolic processing operations 136 may comprise results of one or more operations of the processing engine configured to perform as operations that retrieve and analyze the biometric data 104. The neuro-symbolic processing operations 136 may be configured to establish one or more communication links configured to enable access between a user device 106 determined to perform one or more legitimate communication operations 108. The neuro-symbolic processing operations 136 may be one or more of the operations described in the security operations 200 in FIG. 2.

The one or more communication operations 108 may be one or more operations executed by the server processor 128 configured to enable data objects to be exchanged between the user devices 106 and/or the server 102. In one or more embodiments, the communication operations 108 may be configured to indicate one or more data objects to be exchanged between the server 102 and at least one of the user devices 106. The server 102 may be configured to generate and analyze one or more communication operations 108 to confirm whether one or more entities associated with communication operations 108 are legitimately associated with at least one of the user devices 106. The server 102 may be configured to perform one or more operations in which the server 102 is configured to confirm whether one or more communication operations 108 belong to a specific user device 106.

The one or more data formats 140 may be one or more representations of the biometric data 104 and/or the datapoints 134. The one or more data formats 140 may comprise one or more representations and/or mapping layouts. The data formats 140 may be one or more aspects of the biometric data 104 and/or the datapoints 134. The data formats 140 may be one or more virtual components of the biometric data 104. For example, the data formats 140 may be one or more image formats of an image and/or alphanumeric format associated with a data file. The one or more data formats 140 may be evaluated and/or analyzed by the deep learning networks 170 and/or the decentralized networks 172.

The one or more type information 142 may comprise one or more data identifiers associated for each datapoint 134. The type information 142 may be information specific for each datapoint 134. For example, a datapoint 134a in biometric data 104 comprising an image may be color information indicating a hue associated with a portion of the image. The type information 142 may be color information, density information, or size information among others. Each of the data formats 140 may be associated with one or more of the type information 142.

In one or more embodiments, the anomaly detection operations 150 comprise one or more operations executed in conjunction with the one or more operations of the ML algorithms 164. The one or more anomaly detection operations 150 may be configured to evaluate data exchanged between the user devices 106 and/or the server 102. In one or more embodiments, the anomaly detection operations 150 may be configured to evaluate biometric data 104 (e.g., via the communication operations 108) to be exchanged between the server 102 and at least one of the user devices 106. The anomaly detection operations 150 may be configured to generate and analyze one or more communication operations 108 to confirm whether one or more entities associated with communication operations 108 are legitimately associated with at least one of the user devices 106. The anomaly detection operations 150 may be one or more operations in which the server 102 is configured to confirm whether one or more communication operations 108 associated with a specific entity belong to a specific user device 106.

In some embodiments, one or more denylists may comprise alerts generated to one or more entities in the communication network. In this regard, the denylists may associate callers to the one or more user profiles 158 with fraudulent remarks if an entity is identified to be a bad actor (e.g., one or the electronic attackers 118). The alerts may be warnings generated for the entities in the form of feedback (e.g., notifications, tactile feedback, and/or visual feedback among others). The denylists may be lists comprising online information related to one or more identified electronic attackers 118, spam callers, and otherwise blocked callers. The server 102 may reference the denylists to inform one or more of the user devices 106 that a communication request should not be received. The server 102 may be configured to update the denylists with new information collected from one or more of the electronic attackers 118.

The user information 156 may comprise the one or more user profiles 158, one or more entitlements 160, and one or more services. In one or more embodiments, the user profiles 158 may comprise multiple profiles associated with one or more entitlements 160 to access and/or modify the services. Each of the user profiles 158 may be associated with one or more entitlements 160. The entitlements 160 may indicate that a given user device 106 is allowed to access one or more network resources in accordance with the one or more rules and policies 152. The entitlements 160 may indicate that a given user device 106 is allowed to perform one or more operations in the system 100 (e.g., provide a specific application data access to one of the users 116). To secure or protect operations of the user devices 106 from bad actors, the entitlements 160 may be assigned to a given user profile 158 in accordance with updated security information, which may provide guidance parameters to the use of the entitlements 160 based at least upon corresponding rules and policies 152. In one or more embodiments, the one or more services perform one or more application operations using one or more access commands. In some embodiments, the user profiles 158 may comprise multiple profiles for the users 116. Each user profile 158 may comprise one or more entitlements 160. As described above, the entitlements 160 may indicate that a given user 116 is allowed to access one or more network resources in accordance with one or more rules and policies 152. The entitlements 160 may indicate that a given user 116 is allowed to perform one or more data exchanges with the server 102 via the network 110. In one or more embodiments, each of the user profiles 158 may comprise information about at least one user 116 entitled to trigger one or more communication operations 108.

In one or more embodiments, the ML algorithms 164 may be executed by the server processor 128 to evaluate the communication operations 108 and/or the biometric data 104. Further, the ML algorithms 164 may be configured to interpret and transform one or more request for access to network resources, the one or more communication operations 108, the biometric data 104, and/or the instructions 132 into structured data sets and subsequently stored as files or tables. The ML algorithms 164 may cleanse, normalize raw data, and derive intermediate data to generate uniform data in terms of encoding, format, and data types. The ML algorithms 164 may be executed to run user queries and advanced analytical tools on the structured data and/or the unstructured data in accordance with one or more ML models 144. The ML algorithms 164 may be configured to generate the one or more AI commands 162 based on one or more results of the testing operations. The AI commands 162 may be parameters that proactively trigger one or more of the anomaly detection operations 150. The AI commands 162 may be combined with the existing instructions 132 to dynamically trigger and/or perform the data anomaly detection operations 150 and/or some or all of the communication operations 108. The AI commands 162 may be configured to trigger one or more cognitive AI operations in accordance with one or more ML models 144. The ML models 144 may be trained by the one or more ML algorithms 164 based on historic information associated with any anomaly detection operations 150 performed with the server 102.

The rules and policies 152 may be security configuration commands or regulatory operations predefined by an organization or one or more users 116. In one or more embodiments, the rules and policies 152 may be dynamically defined by the one or more users 116. The rules and policies 152 may be prioritization rules configured to instruct one or more user devices 106 to perform one or more evaluating operations or perform one or more operations in the system 100 in a specific communication operation 108. The one or more rules and policies 152 may be predetermined or dynamically assigned by a corresponding user 116 or an organization associated with the users 116.

In one or more embodiments, the server databases 124 may be one or more repositories configured to store information. In one example, the server 102 may determine the server processor 128 is available (e.g., running) to perform a specific service. In another example, the server 102 may determine that a specific managed server is running to enable a testing application and/or perform the specific service upon receiving a server response indicating that a corresponding managed server is available to perform the service. The server databases 124 may be configured to store one or more representations of data instead of storing coded data. In this regard, the representations may be encoded in accordance with an encoder configured to identify and/or verify exchanged information. For example, the server databases 124 may comprise one or more representations of the biometric data 104 and/or the access commands 148. As the biometric data 104 is obtained, the server processor 128 may be configured to process the biometric data 104 in accordance with the one or more anomaly detection operations 150.

In one or more embodiments, the server 102 may be configured to use symbolic AI to define rules that flag biometric authentication attempts that deviate significantly from typical behavior associated with a user 116. For example, if a user 116a consistently authenticates from one location and suddenly attempts authentication from a distant location, the server 102 may be configured to indicate fraud. In some embodiments, the server 102 may be configured to train a CNN to recognize patterns 146 associated with known fraudulent activities, such as specific types of facial spoofing or fingerprint tampering. At this stage, the server 102 may be configured to use symbolic AI rules to interpret outputs in the CNN and trigger alerts when suspicious patterns 146 are detected. The suspicious patterns 146 may be previously determined patterns to be performed by electronic attackers 118. The server 102 may be configured to execute symbolic AI rules that enforce consistency checks across different biometric modalities and analyze one or more temporal aspects of the biometric data 104, such as the timing and frequency of authentication attempts. For example, if multiple authentication attempts occur within a short time frame, the server 102 may be configured to indicate an electronic attack 122 (e.g., a brute-force attack). The server 102 may be configured to train the CNN to identify anomalies in the biometric data 104, such as unusual facial expressions or atypical fingerprint patterns 146. The server 102 may use the symbolic AI rules to interpret these anomalies and trigger alerts when data formats 140 of the datapoints 134 deviate significantly from expected data formats 140. The server 102 may be configured to define rules for multi-factor authentication using biometric factors and/or non-biometric factors. For example, if a biometric authentication fails but additional authentication factors (e.g., a one-time password) succeed, the server 102 may be configured to indicate fraud.

In some embodiments, server 102 is configured to use symbolic AI rules to enforce security policies and compliance requirements related to biometric authentication. For example, if the biometric data 104 is not captured and stored securely according to regulatory standards, the server may be configured to trigger compliance access violations. In this regard, the server 102 may be configured to train the CNN to recognize adversarial attacks aimed at fooling biometric authentication systems, such as adding imperceptible noise to images comprising biometric data 104. The server 102 may be configured to use symbolic AI rules that may interpret one or more predictions from the CNN and flag potential adversarial attacks. The server 102 may be configured to implement symbolic AI rules that enable the deep learning networks 170 to continuously learn and adapt to new fraud patterns and emerging threats. The server 102 may be configured to periodically update training data associated with the CNN and retraining the models 144 based on new observations. The server 102 may be configured to use symbolic AI rules to incorporate human-in-the-loop (e.g., an agent and/or an administrator) verification for high-risk authentication attempts flagged by the system.

User Device

In one or more embodiments, each of the user devices 106 (e.g., the user device 106a, the user devices 106b-106d in the user device group 112) may be any computing device configured to communicate with other devices, such as the server 102, other user devices 106 in the user device group 112, databases, and the like in the system 100. Each of the user devices 106 may be configured to perform specific functions described herein and interact with the server 102 and/or any other user devices 106. Examples of the user devices 106 comprise, but are not limited to, a laptop, a computer, a smartphone, a tablet, a smart device, an IoT device, a simulated reality device, an augmented reality device, or any other suitable type of device. The requests may be provided by the user devices 106 via one or more interfaces comprising input displays, voice microphones, or sensors capturing gestures performed by a corresponding user 116.

The user devices 106 may be hardware configured to create, transmit, and/or receive information. The user devices 106 may be configured as a provider node or as worker nodes. The user devices 106 may be configured to receive inputs from a user, process the inputs, and generate data information or command information in response. The data information may include documents or files generated using a graphical user interface (GUI).

Referring to the user device 106a as a non-limiting example, the command information may include input selections/commands triggered by a user using a peripheral component or one or more device peripherals 184 (i.e., a keyboard) or an integrated input system (i.e., a touchscreen displaying the GUI). The user devices 106 may be communicatively coupled to the server 102 via a network connection (i.e., the device peripherals 184). The user devices 106 may transmit and receive data information, command information, or a combination of both to and from the server 102 via the device interfaces 182. In one or more embodiments, the user devices 106 are configured to exchange data, commands, and signaling with the server 102. In some embodiments, the user devices 106 are configured to receive at least one security system configuration from the server 102 to implement a security system (one of the one or more local applications 192) at one of the user devices 106.

In one or more embodiments, the device interfaces 182 may be any suitable hardware or software (e.g., executed by hardware) to facilitate any suitable type of communication in wireless or wired connections. These connections may comprise, but not be limited to, all or a portion of network connections coupled to additional user devices 106, the server 102, the Internet, an Intranet, a private network, a public network, a peer-to-peer network, the public switched telephone network, a cellular network, a LAN, a MAN, a WAN, and a satellite network. The device interfaces 182 may be configured to support any suitable type of communication protocol.

In one or more embodiments, the one or more device peripherals 184 may comprise audio devices (e.g., speaker, microphones, and the like), input devices (e.g., keyboard, mouse, and the like), or any suitable electronic component that may provide a modifying or triggering input to the user devices 106. For example, the one or more device peripherals 184 may be speakers configured to release audio signals (e.g., voice signals or commands) during media playback operations. In another example, the one or more device peripherals 184 may be microphones configured to capture audio signals. In one or more embodiments, the one or more device peripherals 184 may be configured to operate continuously, at predetermined time periods or intervals, or on-demand.

The device processor 186 may comprise one or more processors communicatively coupled to and in signal communication with the device interfaces 182, the device peripherals 184, and the device memory 188. The device processor 186 is any electronic circuitry, including, but not limited to, state machines, one or more CPU chips, logic units, cores (e.g., a multi-core processor), FPGAs, ASICs, or DSPs. The device processor 186 may be a programmable logic device, a microcontroller, a microprocessor, or any suitable combination of the preceding. The one or more processors in the device processor 186 are configured to process data and may be implemented in hardware or software executed by hardware. For example, the device processor 186 may be an 8-bit, a 16-bit, a 32-bit, a 64-bit, or any other suitable architecture. The device processor 186 may comprise an ALU to perform arithmetic and logic operations, processor registers that supply operands to the ALU, and store the results of ALU operations, and a control unit that fetches software instructions such as device instructions 190 from the device memory 188 and executes the device instructions 190 by directing the coordinated operations of the ALU, registers, and other components via a device processing engine (not shown). The device processor 186 may be configured to execute various instructions.

The device memory 188 may comprise multiple operation data and one or more local applications 192 associated with the server 102. The operation data may be data configured to enable one or more data processing operations such as those described in relation with the server 102. The operation data may be partially or completely different from those comprised in the server memory 130. The local applications 192 may be one or more of the services described in relation with the server 102. In some embodiments, the local applications 192 may be partially or completely different from those comprised in the server memory 130.

Network

The network 110 facilitates communication between and amongst the various devices of the system 100. The network 110 may be any suitable network operable to facilitate communication between the server 102 and the user devices 106 of the system 100. The network 110 may include any interconnecting system capable of transmitting audio, video, signals, data, data packets, messages, or any combination of the preceding. The network 110 may include all or a portion of a public switched telephone network (PSTN), a public or private data network, a LAN, a MAN, a WAN, a local, regional, or global communication or computer network, such as the Internet, a wireline or wireless network, an enterprise intranet, or any other suitable communication link, including combinations thereof, operable to facilitate communication between the devices.

Electronic Attacker

In one or more embodiments, electronic attackers 118 may be any electronic device that influences the operations of one or more devices in the network 110. In some embodiments, the electronic attacker group 120 comprises multiple devices configured to interfere with operations of devices in the network 110. The attacker group 120 comprises the electronic attacker 118b, the electronic attacker 118c, and the electronic attacker 118d. Each of the electronic attackers may perform one or more attacks 122 (e.g., attacks 122a and attacks 122b). The attacks 122 (e.g., one or more electronic attacks) may be one or more unexpected operations triggered by the electronic attackers 118 in the network 110. In some embodiments, a single electronic attacker 118 may perform one or more attacks 122a. In other embodiments, multiple electronic attackers 118 (e.g., the attacker 118b, the attacker 118b, and the attacker 118d in the attacker group 120) may perform one or more attacks 122b.

Referring as a non-limiting example to the electronic attacker 118a of FIG. 1, the electronic attacker 118a may be hardware and/or software, executed by hardware, which launches the attacks 122a to affect the operations performed by the server 102 and/or the user devices 106. Although not explicitly shown in FIG. 1, the electronic attacker 118a may include a processor, a memory, and a transceiver configured to generate one or more communication signals. In one or more embodiments, the electronic attacker 118a is a new device in a predetermined area in which the server 102 and/or the user devices 106 are located. In some embodiments, radio waves, electromagnetic (EM) signaling, and/or communication operations 108 from the electronic attacker 118a are monitored over time in the network 110 to be evaluated in combination with one or more anomaly detection operations 150.

In one or more embodiments, the electronic attacker 118a may be a person, people, or an automated electric component that use the attacks 122a to hack communications and operations of a specific user device 106 and/or the server 102. As a result of the attacks 122a, the electronic attacker 118a may control communications or operations of one or more of the hacked user device 106. In this regard, the electronic attacker 118*a* may modify, cancel, or generate communications or operations in the hacked user devices 106. The electronic attacker 118*a* may pretend to perform one or more operations on behalf of one or more of the user devices 106.

Deep Learning Networks

In one or more embodiments, the deep learning networks 170 may comprise a neural network architecture configured to enable a computer to understand and interpret images or visual data. The deep learning networks 170 may be one or more artificial neural networks (ANN) configured to extract one or more features from the datapoints 134 in a grid-like matrix dataset. The deep learning networks 170 may comprise of multiple layers 171 configured to perform one or more specific analyses of the datapoints 134. The layers 171 may comprise one or more convolutional layers 171*a*, one or more pooling layers 171*b*, one or more fully connected layers 171*c*, and one or more output layers 171*d*. The convolutional layers 171*a* may apply filters to the datapoints in received biometric data 104 to extract features. The pooling layers 171*b* may be configured to reduce (e.g., down sample) parameters associated with the datapoints 134 to reduce computation. The fully connected layer 171*c* may be configured to make a final prediction representative of a similarity between a current data format 140*a* and an expected format 140*b*. The output layers 171*d* may be configured to provide processed versions of the datapoints 134 into a logistic function for classification tasks where the processed versions of the datapoints 134 convert an output of each class into a probability score of each class.

Decentralized Networks

In one or more embodiments, the decentralized networks 172 comprises peer-to-peer networking protocols and/or blockchain protocols that enable development of serverless applications. The decentralized networks 172 may include multiple electronic components or devices (i.e., nodes 174) comprising specific node data. The nodes 174 may not be required to store or validate all data in the decentralized networks 172. Instead, validation of each node's data may be obtained via peer accountability.

In some embodiments, the nodes 174 may include own data and a reference to all other data in the decentralized networks 172 in accordance with rules and policies 152 preestablished by an electronic component or device outside the decentralized networks 172 (e.g., one or more servers, such as the server 102). These rules and policies 152 may determine how the nodes 174 interact with each other and the server 102. The rules and policies 152 may be updated dynamically or periodically with additional data received as updates via one or more planning components (e.g., electronic devices or components configured to provide updates to the rules and policies 152). The updates may be triggered by a perceived lack of knowledge level in the nodes 174. A perceived knowledge level in the nodes 174 may be identified via node scores (not shown) received from the server 102 as feedback.

In one or more embodiments, each node (i.e., out of nodes 174) in the decentralized networks 172 includes knowledge-specific information and information associated with peer accountability and a perceived knowledge level. Each node may be configured to perform one or more of the neuro-symbolic processing operations 136 that evaluate an overall format of the biometric data 104. Specifically, referencing a node 174*a* as a non-limiting example, includes rules and policies 152*a* and one or more data exchange controls. The data exchange controls may include information corresponding to at least one knowledge domain configured to evaluate aspects of the biometric data 104. In one or more embodiments, the node 174*a* may be configured to receive the datapoints 134 of the biometric data 104 as one or more of initial tokens. Upon receiving the initial tokens, the node 174*a* may be configured to determine whether any of data formats 140 and/or the type information 142 of the initial tokens correspond to the knowledge information included in the data exchange controls.

In other embodiments, the node 174*a* includes a processor (not shown) configured to provide updates corresponding to specific data exchange controls. The processor in the node 174*a* may be configured to provide updated tokens directly to the server processor 128. Further, a processor of the node 174*a* may be configured to route any initial tokens that are not updated to one of the other nodes 174 in accordance with one or more rules and policies 152 governing the decentralized networks 172. The data exchange controls at a given node 174 may be configured to generate a token representative of data exchange requests and perform corresponding interactions in one or more of the decentralized networks 172. In some embodiments, the data exchange controls may enable tokens to perform interactions between a first decentralized network 172*a* and a second decentralized network 172*b*. Each of the decentralized networks 172 may comprise corresponding configuration information configured to interpret the data exchange request in the token.

Operational Flow Overview

FIG. 2 shows multiple security operations 200 in which the system 100 of FIG. 1 is configured to dynamically analyze biometric data 104, in accordance with one or more embodiments. In FIG. 2, the security operations 200 comprise multiple operations in the communication network. The security operations 200 may be performed between the server 102 and one or more electronic devices to determine whether certain entities are associated with one of more of the user devices 106 or one or more of the electronic attackers 118. The security operations 200 comprise multiple biometric captures 202 comprising biometric data 104 collected by an interface 126*a*, an interface 126*b*, an interface 126*c*, an interface 126*d*, and an interface 126*e* and one or more biometric data processing operations 210, one or more structuring operations 212, one or more fusion operations 214, and one or more training operations 216 performed by at least one of the server 102, a deep learning network 170*a*, and/or a decentralized network 172*a*. In some embodiments, one or more data transfers 222 may transmit processed versions of the biometric data 104 from the biometric data processing operations 210 to the structuring operations 212, one or more data transfers 224 may transmit structured versions of the biometric data 104 from the structuring operations 212 to a decentralized network 172*a*, one or more data transfers 226 between the decentralized network 172*a* and the one or more fusion operations 214, one or more data transfers 228 between the one or more fusion operations 214 and the deep learning network 170*a*, one or more data transfers 230 between the deep learning network 170*a* and the decentralized network 172*a*, one or more data transfers 232 between the deep learning network 170*a* and the one or more training operations 216, and one or more data transfers 234 between the decentralized network 172*a* and the one or more training operations 216.

In one or more embodiments, the captures 202 may comprise biometric data 104 obtained from one or more interfaces 126. For example, a capture 202*a* may be an image comprising an iris scan obtained via an interface 126*a* (e.g., an eye scan and/or sensor), a capture 202*b* may be a dataset representative of polygons in a three-dimensional rendering obtained via an interface 126*b* (e.g., a camera), a capture 202*c* may be image data comprising a fingerprint recognition print obtained via an interface 126*c* (e.g., a fingerprint scanner), a capture 202*d* may be one or more analysis graphs comprising vein pattern recognition obtained via an interface 126*d* (e.g., an interveinal scanner), and a capture 202*e* may be sensor data comprising communication feedback information obtained via an interface 126*a* (e.g., one or more sensors in an electronic device). The biometric data 104 may comprise unstructured data and/or structured data. After collection, the server 102 may be configured to transfer received biometric data 104 to one or more biometric data processing operations 210.

In one or more embodiments, the biometric data processing operations 210 may be operations in which the biometric data 104 is classified in accordance with a source of precedence. For example, the biometric data processing may be configured to classify structured data and/or unstructured data in the biometric data 104. The biometric data processing operations 210 may comprise receiving the captures 202 dynamically and/or periodically over time. To capture the biometric data 104, the users 116 may interact with one or more sensors through the interfaces 126. Herein, the server 102 may be configured to process the collected biometric data 104 internally to authenticate the users 116 or allow access to one or more network resources in the communication system. In transfers 222, the classified data is provided and/or transferred from the biometric data processing operations 210 to one or more structuring operations 212. The structuring operations 212 may be configured to transform any unstructured data 240 into structured data 242 via one or more transformations 244. In this regard, any unstructured datapoints 134*a* are converted into one or more structured datapoints 134*b*. In transfers 224, the structured data 242 is provided and/or transferred from the structuring operations 212 to a decentralized network 172*a*.

In some embodiments, the decentralized network 172*a* may be configured to determine whether the biometric data 104 comprises a predefined format 140 corresponding to a specific type information 142 associated with the biometric data 104. The server 102 may be configured to determine type information 142 associated with specific biometric data 104 and assign evaluation of the biometric data 104 to the nodes 174 in the decentralized network 170*a* based on the type information 142. In the decentralized network 172*a*, the server 102 may be configured to determine whether the biometric data 104 comprises suspicious data formats 140 or one or more of the expected data formats 140. The decentralized network 172*a* may be configured to flag the biometric data 104 as comprising suspicious activity if the data format 140 associated with the biometric data 104 is not found in a repository of data formats 140. The decentralized network 172*a* may be configured to flag the biometric data 104 as comprising non-suspicious activity if the data format 140 associated with the biometric data 104 is found in a repository of data formats 140. The decentralized network 170*a* may be configured to use one or more knowledge graphs where knowledge domains associated with the nodes 174 are parameterized based on a central node path allocation to determine a pattern identification flow. These parameterized semi-static nodes may be loosely coupled in the knowledge graph for required load balancing based on number of parallel transactions, centralized node selection, and the like. In the transfers 226, the flagged biometric data 104 is provided and/or transferred from the decentralized network 170*a* to the one or more fusion operations 214.

The fusion operations 214 may be configured to combine one or more user information 156 with environment information 250 associated with one or more captures 202. The fusion operations 214 may be configured to determine multiple identifiers based on the environmental information 250 and attach the multiple identifiers to the analyzed biometric data 104. The environment information 250 may be one or more information elements referencing environment data associated with the captures 202. For example, an environment information 250*a* associated with biometric data 104*a* collected in a room with low light may reference that the biometric data 104 comprises a level of light exposure. Herein, the server may be configured to determine whether the level of light exposure matches the light in the room at the time of the capture of the biometric data 104*a*. In the transfers 228, the fused data may be configured to provided and/or transferred from the fusion operations 214 to the deep learning network 170*a*. The deep learning network 170*a* may be configured to implement a dynamic real-time processing engine that continuously ingest biometric data 104 and apply a symbolic neural network model for validation and generate responses in real-time. The deep learning network 170*a* may be configured to handle parallel processing and prioritizing critical task to meet response time requirements. The deep learning network 170*a* may be configured to scale seamlessly to accommodate growing data volumes. The deep learning network 170*a* may be configured to detect anomalies or failures in the collected biometric data 104*a* and notify security personnel and/or security systems in real-time. In the transfers 230, the processed data is shared between the decentralized network 172*a* and the deep learning network 170*a*.

In one or more embodiments, the training operations 216 may be performed by the server 102, the decentralized network 172*a*, and/or the deep learning network 170*a*. In transfers 232 and transfers 234, the server 102, the decentralized network 172*a*, and/or the deep learning network 170*a* may be configured to share processed data to train the models 144.

In the example of FIG. 2, the training operations 216 comprise operations 260-296 based on one or more neuro-symbolic processing operations 136 and one or more anomaly detection operations 150. The training operations 216 may comprise a feedback loop to adapt and evolve new fraud patterns 146 emerging over time. Herein, the training operations 216 may comprise incorporating feedback mechanisms to continuously update and refine the symbolic reasoning system based in new evidence, feedback from users/security experts, and evolving fraud patterns. The operation 260, the operation 261, the operation 270, the operation 271, and the operation 280 may be performed by the one or more convolutional layers 171*a*. The operation 262, the operation 272, and the operation 282 may be performed by the one or more pooling layers 171*b*. The operation 263, the operation 273, and the operation 283 may be performed by the one or more fully connected layers 171*c*. The operation 264, the operation 274, and the operation 284 may be performed by the one or more output layers 171*d*.

In operations 260-296, the training operations 216 may comprise one or more review operations in which multiple biometric data 104 is separated and evaluated individually. The operations 260-296 may be configured to generate one or more fusion scores for each biometric data 104, aggregate the fusion scores, and determine whether the fusion scores indicate an incremental change in training data.

At operations 260-264, the server 102 may be configured to evaluate collected biometric data 104a. At operation 260, the server 102 may be configured to receive the biometric data 104a comprising an original fingerprint image. At operation 261, the server 102 may be configured to generate a preprocessed version of the fingerprint image in which any unstructured elements of the biometric data 104a are structured for future processing. At operation 262, the deep learning network 170a may be configured to perform one or more CNN feature extractions as performed by the one or more layers 171. At operation 263, the server 102 may be one or more classification operations as performed by a classifier. The classifier may be a SoftMax classifier comprising a supervised learning algorithm configured to normalize data in accordance with one or more probability models, a Random Forest classifier comprising a supervised learning algorithm configured to combine output data into multiple decision trees, and the like. At operation 264, the server 102 may be configured to generate one or more fingerprint scores.

At operations 270-274, the server 102 may be configured to evaluate collected biometric data 104b. At operation 270, the server 102 may be configured to receive the biometric data 104b comprising an original finger vein image. At operation 271, the server 102 may be configured to generate a preprocessed version of the finger vein image in which any unstructured elements of the biometric data 104b are structured for future processing. At operation 272, the deep learning network 170a may be configured to perform one or more CNN feature extractions as performed by the one or more layers 171. At operation 273, the server 102 may be one or more classification operations as performed by a classifier. The classifier may be a SoftMax classifier comprising a supervised learning algorithm configured to normalize data in accordance with one or more probability models, a Random Forest classifier comprising a supervised learning algorithm configured to combine output data into multiple decision trees, and the like. At operation 274, the server 102 may be configured to generate one or more finger vein scores.

At operations 280-284, the server 102 may be configured to evaluate collected biometric data 104c. At operation 280, the server 102 may be configured to receive the biometric data 104c comprising an original face image. At operation 281, the deep learning network 170a may be configured to perform one or more CNN feature extractions as performed by the one or more layers 171. At operation 282, the server 102 may be one or more classification operations as performed by a classifier. The classifier may be a SoftMax classifier comprising a supervised learning algorithm configured to normalize data in accordance with one or more probability models, a Random Forest classifier comprising a supervised learning algorithm configured to combine output data into multiple decision trees, and the like. At operation 283, the server 102 may be configured to generate one or more face scores.

In one or more embodiments, the operations 290-296 may be configured to evaluate discrepancies between the analyses biometric data and data determined to be associated with user profiles 158. At operation 290, the training operations 216 may comprise fusion of the fingerprint score, the finger vein score, and the face score to generate a fusion score. The fusion score may be an aggregated score in which the fingerprint score, the finger vein score, and the face score are added, averaged, and/or normalized. At operation 292, the fusion score may be compared to one or more thresholds 138. If the fusion score is less than one or more thresholds

138, the training operations 216 may proceed to operation 294. If the fusion score is equal to or greater than one or more thresholds 138, the training operations 216 may proceed to operation 296. At operation 294, the biometric data 104a, the biometric data 104b, and the biometric data 104c are determined to be one or more biometric inputs associated with one or more specific user profiles 158. At operation 296, the biometric data 104a, the biometric data 104b, and the biometric data 104c are determined to be one or more falsified biometric inputs associated with one or more specific electronic attackers 118.

In one or more embodiments, the server 102 may be configured to assign a fusion score to each biometric data 104 collected from the interfaces 126. Each of the biometric data 104 may be determined as part of the training operations 216 to be associated with a trusted user device 106 or an electronic attacker 118.

Example Process to Dynamically Analyze Biometric Data

FIG. 3 illustrates an example flowchart of a process 300 configured to dynamically analyze biometric data 104, in accordance with one or more embodiments. Modifications, additions, or omissions may be made to the process 300. The process 300 may comprise more, fewer, or other operations than those shown in FIG. 3. For example, operations may be performed in parallel or in any suitable order. While at times discussed as the server 102, the user devices 106, or components of any of thereof performing operations described in operations 302-342 in the process 300, any suitable system or components of the system 100 may perform one or more operations of the process 300. For example, one or more operations of the process 300 may be implemented, at least in part, in the form of instructions 132 of FIG. 1, stored on non-transitory, tangible, machine-readable media (e.g., a non-transitory computer-readable medium such as server memory 130 of FIG. 1) that when run by one or more processors (e.g., the processor 128 of FIG. 1) may cause the one or more processors to perform operations described in operations 302-342.

The process 300 starts at operation 302, where the server 102 is configured to receive biometric data 104a from an interface 126a. The biometric data 104a may be associated with a user profile 158a. At operation 304, the server 102 is configured to execute an ML algorithm 164 to determine type information 142a associated with the biometric data 104a. At operation 306, the server 102 is configured to assign evaluation of the biometric data 104a to nodes 174 in a decentralized network 172a based at least in part upon the type information 142a. The nodes 174 may be configured to perform one or more neuro-symbolic processing operations 136 that evaluate a format 140a of the biometric data 104a.

At operation 310, the server 102 is configured to determine whether the biometric data 104a matches one or more predefined formats (e.g., one or more biometric data formats 140). Herein, the decentralized network 172a may be configured to determine whether the biometric data 104a comprises a predefined format corresponding to the type information 142. If the server 102 determines that the biometric data 104a does not match one or more predefined formats (e.g., NO), the process 300 proceeds to operation 332. If the server 102 determines that the biometric data 104 matches one or more predefined formats (e.g., YES), the process 300 proceeds to operation 312.

At operation 312, the server 102 is configured to transmit the biometric data 104a to a deep learning network 170a configured to perform anomaly detection operations 150 that evaluate authenticity of the biometric data 104a. At operation 314, the server 102 is configured to determine, in the deep learning network 170a, an overall pattern 146a of the biometric data 104a. At operation 316, the server 102 is configured to compare the overall pattern 146a of the biometric data 104a to one or more reference suspicious patterns 146.

At operation 320, the server 102 is configured to determine whether the overall pattern 146a matches one or more reference suspicious patterns 146 (e.g., one or more biometric data formats 140). If the server 102 determines that the overall pattern 146a does not match one or more reference suspicious patterns 146 (e.g., NO), the process 300 proceeds to operation 332. If the server 102 determines that the overall pattern 146a matches one or more reference suspicious patterns 146 (e.g., YES), the process 300 proceeds to operation 322.

At operation 322, the server 102 is configured to flag the biometric data 104a as comprising non-suspicious activity. At operation 324, the server 102 is configured to generate a report referencing that the biometric data 104a is associated with non-suspicious activity.

At operation 332, the server 102 is configured to flag the biometric data 104a as comprising suspicious activity. At operation 334, the server 102 is configured to generate a report referencing that the biometric data 104a is associated with suspicious activity.

In some embodiments, the server 102 may be configured to determine whether the biometric data 104a comprises a suspicious activity upon evaluating the biometric data 104a against a threshold 138. The process 300 may end at operation 342, where the server 102 may be configured to train one or more machine learning models 144 using the report.

Scope of the Disclosure

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system, comprising:
a memory operable to store:
    a machine learning algorithm configured, when executed, to evaluate data in accordance with one or more neural network models; and
    a plurality of suspicious patterns previously determined to be performed by electronic attackers; and
at least one processor communicatively coupled to the memory and configured to:
    receive first biometric data from a first interface, the first biometric data being associated with a first user profile; and
    execute the machine learning algorithm to:
        determine first type information associated with the first biometric data;
        assign evaluation of the first biometric data to a first plurality of nodes in a decentralized network based at least in part upon the first type information; the first plurality of nodes being configured to perform a plurality of neuro-symbolic processing operations that evaluate a first overall format of the first biometric data;
        determine, in the decentralized network, whether the first biometric data comprises a first predefined format corresponding to the first type information;
        in response to determining that the first biometric data comprises the first predefined format corresponding to the first type information, transmit the first biometric data to a deep learning network configured to perform a plurality of anomaly detection operations that evaluate authenticity of the first biometric data;
        determine, in the deep learning network, a first overall pattern of the first biometric data;
        compare the first overall pattern of the first biometric data to the plurality of suspicious patterns;
        determine whether the first overall pattern of the first biometric data matches at least one portion of a first suspicious pattern of the plurality of suspicious patterns; and
        in response to determining the first overall pattern of the first biometric data matches the at least one portion of the first suspicious pattern of the plurality of suspicious patterns, flag the first biometric data as being associated with suspicious activity.

2. The system of claim 1, wherein the at least one processor is further configured to:
generate a suspicious activity report comprising the first biometric data and the first overall pattern; and
train the one or more neural network models using the suspicious activity report.

3. The system of claim 1, wherein the at least one processor is further configured to:
receive second biometric data from a second interface, the second biometric data being associated with a second user profile; and
execute the machine learning algorithm to:
    determine second type information associated with the second biometric data;
    assign evaluation of the second biometric data to a second plurality of nodes in the decentralized network based at least in part upon the second type information; the second plurality of nodes being configured to perform the plurality of neuro-symbolic processing operations that evaluate a second overall format of the second biometric data;

determine, in the decentralized network, whether the second biometric data comprises a second predefined format corresponding to the second type information;

in response to determining that the second biometric data comprises the second predefined format corresponding to the second type information, transmit the second biometric data to the deep learning network configured to perform the plurality of anomaly detection operations that evaluate authenticity of the second biometric data;

determine, in the deep learning network, a second overall pattern of the second biometric data;

compare the second overall pattern of the second biometric data to the plurality of suspicious patterns;

determine whether the second overall pattern of the second biometric data matches at least one portion of a second suspicious pattern of the plurality of suspicious patterns; and in response to determining the second overall pattern of the second biometric data does not match the at least one portion of the second suspicious pattern of the plurality of suspicious patterns, flag the second biometric data as being associated with non-suspicious activity.

4. The system of claim 1, wherein the at least one processor is further configured to:

receive second biometric data from a second interface, the second biometric data being associated with a second user profile; and execute the machine learning algorithm to:

determine second type information associated with the second biometric data;

assign evaluation of the second biometric data to a second plurality of nodes in the decentralized network based at least in part upon the second type information; the second plurality of nodes being configured to perform the plurality of neuro-symbolic processing operations that evaluate a second overall format of the second biometric data;

determine, in the decentralized network, whether the second biometric data comprises a second predefined format corresponding to the second type information;

in response to determining that the second biometric data comprises the second predefined format corresponding to the second type information, transmit the second biometric data to the deep learning network configured to perform the plurality of anomaly detection operations that evaluate authenticity of the second biometric data;

determine, in the deep learning network, a second overall pattern of the second biometric data;

compare the second overall pattern of the second biometric data to the plurality of suspicious patterns;

determine whether the second overall pattern of the second biometric data matches at least one portion of a second suspicious pattern of the plurality of suspicious patterns within a predefined suspiciousness threshold; and in response to determining the second overall pattern of the second biometric data matches the at least one portion of the second suspicious pattern of the plurality of suspicious patterns within the predefined suspiciousness threshold, flag the second biometric data as being associated with suspicious activity.

5. The system of claim 1, wherein:

the deep learning network is a convolutional neural network comprising a convolutional layer, a pooling layer, a fully connected layer, and an output layer.

6. The system of claim 1, wherein:

the first type information comprises that the first biometric data comprises an iris scan.

7. The system of claim 1, wherein:

the first type information comprises that the first biometric data comprises an image of a face of a person.

8. The system of claim 1, wherein:

the first type information comprises that the first biometric data comprises a fingerprint of a fingerprint scan.

9. The system of claim 1, wherein:

the first type information comprises that the first biometric data comprises an image of one or more vein patterns.

10. A method, comprising:

receiving first biometric data from a first interface, the first biometric data being associated with a first user profile; and executing a machine learning algorithm to perform one or more operations comprising:

determining first type information associated with the first biometric data;

assigning evaluation of the first biometric data to a first plurality of nodes in a decentralized network based at least in part upon the first type information; the first plurality of nodes being configured to perform a plurality of neuro-symbolic processing operations that evaluate a first overall format of the first biometric data;

determining, in the decentralized network, whether the first biometric data comprises a first predefined format corresponding to the first type information;

in response to determining that the first biometric data comprises the first predefined format corresponding to the first type information, transmitting the first biometric data to a deep learning network configured to perform a plurality of anomaly detection operations that evaluate authenticity of the first biometric data;

determining, in the deep learning network, a first overall pattern of the first biometric data;

comparing the first overall pattern of the first biometric data to a plurality of suspicious patterns previously determined to be performed by electronic attackers;

determining whether the first overall pattern of the first biometric data matches at least one portion of a first suspicious pattern of the plurality of suspicious patterns; and in response to determining the first overall pattern of the first biometric data matches the at least one portion of the first suspicious pattern of the plurality of suspicious patterns, flagging the first biometric data as being associated with suspicious activity.

11. The method of claim 10, further comprising:

generating a suspicious activity report comprising the first biometric data and the first overall pattern; and training one or more neural network models using the suspicious activity report.

12. The method of claim 10, further comprising:

receiving second biometric data from a second interface, the second biometric data being associated with a second user profile; and executing the machine learning algorithm to perform one or more additional operations comprising:

determining second type information associated with the second biometric data;

assigning evaluation of the second biometric data to a second plurality of nodes in the decentralized network based at least in part upon the second type information;

the second plurality of nodes being configured to perform the plurality of neuro-symbolic processing operations that evaluate a second overall format of the second biometric data;

determining, in the decentralized network, whether the second biometric data comprises a second predefined format corresponding to the second type information;

in response to determining that the second biometric data comprises the second predefined format corresponding to the second type information, transmitting the second biometric data to the deep learning network configured to perform the plurality of anomaly detection operations that evaluate authenticity of the second biometric data;

determining, in the deep learning network, a second overall pattern of the second biometric data;

comparing the second overall pattern of the second biometric data to the plurality of suspicious patterns;

determining whether the second overall pattern of the second biometric data matches at least one portion of a second suspicious pattern of the plurality of suspicious patterns; and in response to determining the second overall pattern of the second biometric data does not match the at least one portion of the second suspicious pattern of the plurality of suspicious patterns, flagging the second biometric data as being associated with non-suspicious activity.

13. The method of claim 10, further comprising:

receiving second biometric data from a second interface, the second biometric data being associated with a second user profile; and executing the machine learning algorithm to perform one or more additional operations comprising:

determining second type information associated with the second biometric data;

assigning evaluation of the second biometric data to a second plurality of nodes in the decentralized network based at least in part upon the second type information;

the second plurality of nodes being configured to perform the plurality of neuro-symbolic processing operations that evaluate a second overall format of the second biometric data;

determining, in the decentralized network, whether the second biometric data comprises a second predefined format corresponding to the second type information;

in response to determining that the second biometric data comprises the second predefined format corresponding to the second type information, transmitting the second biometric data to the deep learning network configured to perform the plurality of anomaly detection operations that evaluate authenticity of the second biometric data;

determining, in the deep learning network, a second overall pattern of the second biometric data;

comparing the second overall pattern of the second biometric data to the plurality of suspicious patterns;

determining whether the second overall pattern of the second biometric data matches at least one portion of a second suspicious pattern of the plurality of suspicious patterns within a predefined suspiciousness threshold; and in response to determining the second overall pattern of the second biometric data matches the at least one portion of the second suspicious pattern of the plurality of suspicious patterns within the predefined suspiciousness threshold, flagging the second biometric data as being associated with suspicious activity.

14. The method of claim 10, wherein:

the deep learning network is a convolutional neural network comprising a convolutional layer, a pooling layer, a fully connected layer, and an output layer.

15. The method of claim 10, wherein:

the first type information comprises that the first biometric data comprises an iris scan.

16. A non-transitory computer-readable medium storing instructions that when executed by a processor cause the processor to:

receive first biometric data from a first interface, the first biometric data being associated with a first user profile; and execute a machine learning algorithm to:

determine first type information associated with the first biometric data;

assign evaluation of the first biometric data to a first plurality of nodes in a decentralized network based at least in part upon the first type information; the first plurality of nodes being configured to perform a plurality of neuro-symbolic processing operations that evaluate a first overall format of the first biometric data;

determine, in the decentralized network, whether the first biometric data comprises a first predefined format corresponding to the first type information;

in response to determining that the first biometric data comprises the first predefined format corresponding to the first type information, transmit the first biometric data to a deep learning network configured to perform a plurality of anomaly detection operations that evaluate authenticity of the first biometric data;

determine, in the deep learning network, a first overall pattern of the first biometric data;

compare the first overall pattern of the first biometric data to a plurality of suspicious patterns previously determined to be performed by electronic attackers;

determine whether the first overall pattern of the first biometric data matches at least one portion of a first suspicious pattern of the plurality of suspicious patterns; and in response to determining the first overall pattern of the first biometric data matches the at least one portion of the first suspicious pattern of the plurality of suspicious patterns, flag the first biometric data as being associated with suspicious activity.

17. The non-transitory computer-readable medium of claim 16, wherein, when executed by the processor, the instructions further cause the processor to:

generate a suspicious activity report comprising the first biometric data and the first overall pattern; and train one or more neural network models using the suspicious activity report.

18. The non-transitory computer-readable medium of claim 16, wherein, when executed by the processor, the instructions further cause the processor to:

receive second biometric data from a second interface, the second biometric data being associated with a second user profile; and execute the machine learning algorithm to:

determine second type information associated with the second biometric data;

assign evaluation of the second biometric data to a second plurality of nodes in the decentralized network based at least in part upon the second type information; the second plurality of nodes being configured to perform the plurality of neuro-symbolic processing operations that evaluate a second overall format of the second biometric data;

determine, in the decentralized network, whether the second biometric data comprises a second predefined format corresponding to the second type information;

in response to determining that the second biometric data comprises the second predefined format corresponding to the second type information, transmit the second biometric data to the deep learning network configured to perform the plurality of anomaly detection operations that evaluate authenticity of the second biometric data;

determine, in the deep learning network, a second overall pattern of the second biometric data;

compare the second overall pattern of the second biometric data to the plurality of suspicious patterns;

determine whether the second overall pattern of the second biometric data matches at least one portion of a second suspicious pattern of the plurality of suspicious patterns; and in response to determining the second overall pattern of the second biometric data does not match the at least one portion of the second suspicious pattern of the plurality of suspicious patterns, flag the second biometric data as being associated with non-suspicious activity.

19. The non-transitory computer-readable medium of claim 16, wherein, when executed by the processor, the instructions further cause the processor to:

receive second biometric data from a second interface, the second biometric data being associated with a second user profile; and execute the machine learning algorithm to:

determine second type information associated with the second biometric data;

assign evaluation of the second biometric data to a second plurality of nodes in the decentralized network based at least in part upon the second type information; the second plurality of nodes being configured to perform the plurality of neuro-symbolic processing operations that evaluate a second overall format of the second biometric data;

determine, in the decentralized network, whether the second biometric data comprises a second predefined format corresponding to the second type information;

in response to determining that the second biometric data comprises the second predefined format corresponding to the second type information, transmit the second biometric data to the deep learning network configured to perform the plurality of anomaly detection operations that evaluate authenticity of the second biometric data;

determine, in the deep learning network, a second overall pattern of the second biometric data;

compare the second overall pattern of the second biometric data to the plurality of suspicious patterns;

determine whether the second overall pattern of the second biometric data matches at least one portion of a second suspicious pattern of the plurality of suspicious patterns within a predefined suspiciousness threshold; and in response to determining the second overall pattern of the second biometric data matches the at least one portion of the second suspicious pattern of the plurality of suspicious patterns within the predefined suspiciousness threshold, flag the second biometric data as being associated with suspicious activity.

20. The non-transitory computer-readable medium of claim 16, wherein:

the deep learning network is a convolutional neural network comprising a convolutional layer, a pooling layer, a fully connected layer, and an output layer.

* * * * *